United States Patent
Manzano Macho et al.

(10) Patent No.: US 10,180,963 B2
(45) Date of Patent: Jan. 15, 2019

(54) LOAD SHEDDING IN A DATA STREAM MANAGEMENT SYSTEM

(71) Applicant: Telefonaktiebolaget LM Ericsson (publ), Stockholm (SE)

(72) Inventors: David Manzano Macho, Madrid (ES); Luis Maria Lafuente Alvarez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 728 days.

(21) Appl. No.: 14/648,873

(22) PCT Filed: Dec. 18, 2012

(86) PCT No.: PCT/EP2012/075955
§ 371 (c)(1),
(2) Date: Jun. 1, 2015

(87) PCT Pub. No.: WO2014/094825
PCT Pub. Date: Jun. 26, 2014

(65) Prior Publication Data
US 2015/0317363 A1     Nov. 5, 2015

(51) Int. Cl.
*G06F 17/30* (2006.01)
*G06N 99/00* (2010.01)

(52) U.S. Cl.
CPC .. *G06F 17/30516* (2013.01); *G06F 17/30595* (2013.01); *G06N 99/005* (2013.01)

(58) Field of Classification Search
CPC combination set(s) only.
See application file for complete search history.

(56) References Cited

U.S. PATENT DOCUMENTS 8,762,369 B2 * 6/2014 Macho ............... G06F 17/30507
                                                    707/706
8,909,671 B2 * 12/2014 Pallares Lopez ..... G06F 9/5083
                                                    707/773
(Continued)

FOREIGN PATENT DOCUMENTS

WO       2012084051 A1    6/2012
WO    WO 2012084051 A1 *  6/2012  ........... G06F 9/5083

OTHER PUBLICATIONS

Ma, Li, Qiongsheng Zhang, Kun Wang, Xin Li, and Hongan Wang. "Semantic load shedding over real-time data streams." In Computational Intelligence and Design, 2008. ISCID'08. International Symposium on, vol. 1, pp. 465-468. IEEE, 2008.*
(Continued)

*Primary Examiner* — Farhan M Syed
(74) *Attorney, Agent, or Firm* — Sage Patent Group

(57) ABSTRACT

A data stream management system (DSMS) receives an input data stream from data stream sources and respective location information associated with sets of the data stream sources. A continuous query is executed against data items received via the input data streams to generate at least one client output data stream. A load shedding process is executed when the DSMS is overloaded with data from the input data streams. When the DSMS is not overloaded and for the location information associated with each of the data stream source sets, a respective utility value is determined indicating a utility to the client of data from the data stream source sets. The location information is stored in association with the corresponding data utility value. The location information received when the DSMS is overloaded is used, together with the data utility values, to identify input data streams whose data items are to be discarded.

19 Claims, 9 Drawing Sheets

(56) References Cited

U.S. PATENT DOCUMENTS

| | | | |
|---|---|---|---|
| 2003/0061368 A1 | 3/2003 | Chaddha | |
| 2011/0313844 A1* | 12/2011 | Chandramouli | G06Q 30/0241 705/14.42 |
| 2013/0268560 A1* | 10/2013 | Pallares Lopez | G06F 9/5083 707/770 |
| 2014/0052729 A1* | 2/2014 | Macho | G06F 17/30507 707/738 |
| 2015/0370858 A1* | 12/2015 | Lafuente Alvarez | G06F 17/30292 707/770 |

OTHER PUBLICATIONS

Tatbul, Nesime, Uğur çetintemel, Stan Zdonik, Mitch Cherniack, and Michael Stonebraker. "-Load Shedding in a Data Stream Manager." In Proceedings 2003 VLDB Conference, pp. 309-320. 2003.*

Park, Jaeseok, and Haengrae Cho. "Semantic load shedding for prioritized continuous queries over data streams." In International Symposium on Computer and Information Sciences, pp. 813-822. Springer, Berlin, Heidelberg, 2005.*

International Search Report and Written Opinion dated Jul. 10, 2013 for International Application Serial No. PCT/EP2012/075955, International Filing Date—Dec. 18, 2012 consisting of 11-pages.

Abadi et al: "Aurora: A New Model and Architecture for Data Stream Management", VLDB Journal 2003, Digital Object IDentifier (DOI) 10.1007/s00778-003-0095-z consisting of 20-pages.

Ali et al. "Nile-PDT: A Phenomenon Detection and Tracking Framework for Data Stream Management Systems", VLDB '05 Proceedings of the 31st International Conference on very large data bases, Aug. 30, 2005 (Aug. 30, 2005),—Sep. 2, 2005 (Sep. 2, 2005), pp. 1295-1298, XP040026517, ISBN: 1-59593-154-6 Aug. 30, 2005 consisting of 4-pages.

Ali et al: "Scalability Management in Sensor-Network Phenomena Bases", Scientific and Statistical Database Management, 2006. 18th International Conference in Vienna, Austria Jul. 3-5, 2006, Piscataway, NJ, USA, IEEE, 3pages 91-100, XP010927074, DOI: 10.1109/SSDBM.2006.46 ISBN: 978-0-7695-2590-7 Jul. 3, 2006 (Jul. 3, 2006) consisting of 10-pages.

* cited by examiner

| Sensor identity | Temperature (°C) | Humidity (%) | CO level | Time |

LOAD SHEDDING IN A DATA STREAM MANAGEMENT SYSTEM

TECHNICAL FIELD

The present invention generally relates to the field of data stream management systems and more specifically to load shedding in data stream management systems.

BACKGROUND

Traditional relational database management systems (DBMSs) have been researched for over thirty years and are used for a wide range of applications. One of their key features is the storage of data as a collection of persistent "relations", often referred to as tables. A relation is defined as a set of tuples that have the same attributes, each tuple representing a data element and the information about that element. In a DBMS, a table (or relation) is organized into rows and columns. Each row of the table represents a tuple and each column represents an attribute common to all tuples (rows).

Another key feature of a DBMS is a set of well-defined operations (or "queries") that can be issued by any DBMS client in order to read, write, delete or modify the stored data. Structured Query Language (SQL) is the most widespread query language for this purpose, although it is often enriched with proprietary add-ons.

The conventional DBMS is also characterised by having highly optimized query processing and transaction management components, as illustrated in FIG. 1. A query from a DBMS client 1 is received by the DBMS 2, and is processed by a query parsing unit 3 of the DSMS to parse the query and analyse it in order to verify that it is both syntactically and semantically correct. Once this is done, a query plan is generated by the DBMS's query planner 4. A query plan is a set of step-by-step instructions defining how the query is to be executed, whose details depend on how the concrete DBMS is implemented. The query plan aims to optimise, for example, the number of accesses to the physical storage device 5 (e.g. a hard disk) in order to speed up the execution time. Transaction management secures the so-called "ACID" properties (i.e. "Atomicity, Consistency, Isolation and Durability").

Queries that are processed by a traditional DBMS are termed "ad hoc" queries. That is, the query is sent to the DBMS and the response to that query, which is both valid at that specific moment and complete, is sent back. Traditional (ad hoc) queries are typically specified in a particular format, optimized, and evaluated once over a "snapshot" of a database; in other words, over a static view of the data in the database. The stored data it which is to be operated on during processing of the query must be stable, i.e. not subject to any other ongoing database transaction since, for example, a high ratio of write queries can harm the performance of the DBMS serving read queries.

In recent years, there has emerged another class of data intensive applications (such as those intended for sensor data processing, network management in telecommunications networks and stock trading) that need to process data at a very high input rate. Moreover, these applications need to process data that is typically received continuously over long periods of time in the form of a data stream. As a result, the amount of data to be processed can be unbounded. In principle, stream data could be processed by a traditional database management system, by loading incoming stream data into persistent relations and repeatedly executing the same ad hoc queries over these relations.

However, there are several problems with this approach. Firstly, the storage of stream data, indexing (as needed) and querying would add considerable delay or latency) in response time, which may not be acceptable to many stream-based applications. At the core of this mismatch is the requirement that data needs to be persisted on a secondary storage device 5, such as a hard disk typically having a high storage capacity and high latency, before it can be accessed and processed by a DBMS 2 implemented in main memory, such as a RAM-based storage device having a lower latency but typically lower storage capacity.

In addition, the above-described "snapshot" approach to evaluating stream data may not always be appropriate since the changes in values over an interval can be important for stream processing applications, for example where the application needs to make a decision based on changes in a monitored temperature. Furthermore, the inability to specify Quality of Service (QoS) requirements for processing a query (such as latency or response time) to a traditional DBMS makes its usage less acceptable for stream-based applications.

It will therefore be appreciated that the characteristics of the conventional DBMS (i.e. the passive role it plays, the need for standardised query formats and associated pre-defined query plans, stable data, etc.) make the DBMS unsuitable for serving applications that require the processing of huge amounts of data. An example is an application performing Complex Event Processing (CEP) over a stream of data arriving periodically or continuously, from one or a plurality of data sources (e.g. sensors emitting their measured values, servers sending real-time stock rates, etc.), whose number is unpredictable.

Hence, the techniques developed for DBMSs need to be re-examined to meet the requirements of applications that use stream data. This re-examination has given rise to a paradigm shift along with new approaches and extensions to current techniques for query modelling, optimization, and data processing in order to meet the requirements of an increasing number of stream-based applications. Systems that have been developed to process data streams on a real-time basis to meet the needs of stream-based applications are widely known as Data Stream Management Systems (DSMSs).

FIG. 2 shows a DSMS 10 together with a DSMS client 20. Queries for DSMS 10 are also expressed in a standard language similar to SQL (e.g. Continuous Query Language (CQL) and its derivatives) and a query plan is also produced. However, the queries executed in a DSMS are termed "continuous queries" (CQs) and differ from their DBMS counterparts principally by being specified once (commonly via provisioning, e.g. via operation and maintenance interfaces) and then evaluated repeatedly against new data over a specified life span or as long as there is data in the input stream(s) 11. A continuous query can be regarded as a set of one or more logical operations (e.g. filter operations, joint operations etc.) that are applied to data in the input data stream(s). Thus, continuous queries are long-running queries that produce output continuously. The result of executing a CQ is a therefore an output data stream 12, possibly with differing rates and schema as compared to the corresponding input data stream(s). The data items in the input data stream(s) 11 can be regarded as "raw events" while those in the output stream which generally convey more abstract information as a result of the CQ execution, can be regarded as "computed events".

Accordingly, a DSMS is not required to store in a permanent manner all the data from the input streams (although it might store some the received data in certain cases, at least temporarily, for example whenever historical data is needed). Data is extracted and processed by a DSMS as it is received continuously from the incoming streams (taking the order of data arrival into account), and output streams are produced as a result of the execution of CQs in a substantially continuous manner. Thus, in contrast to the traditional DBMS, a DSMS assumes an active role long as it does not need to receive a (explicit) read query from a database client for sending some data to the client based on the stream data the DSMS currently holds.

Incoming streams 11 to, and outgoing streams 12 from, the DSMS can be regarded as an unbounded sequence of data items that are usually ordered either explicitly by a time-based reference such as a time stamp, or by the values of one or more data elements (e.g. the packet sequence identifier in an IF session). A data item of a data stream can be regarded as a tuple of a relation. In this context, tuples comprise a known sequence of fields and essentially correspond with application-specific information. Hereinafter, the terms "data item" and "tuple" are used interchangeably.

One example of tuples that can be received by a DSMS within incoming data streams is shown in FIG. 3. In this case, a sensor having a unique ID sends, in a continuous manner (e.g. every second), a measure of the temperature, and the humidity and CO levels of its surroundings. This constitutes a stream of data. A large number of sensors (even hundreds of thousands) can feed a DSMS which can produce one or more output data streams based on the received incoming data streams. For example, the CQ execution by a DSMS over incoming data streams comprising tuples as illustrated in FIG. 3 can produce an output data stream for a certain DSMS client application that contains the sensor identity, CO level and time information, only when the monitored temperature exceeds a certain threshold.

A more typical DSMS deployment is illustrated in FIG. 4, where the DSMS 10 receives data from one or more incoming data streams 11, executes a continuous query against the received data and sends at least some of the received data to a plurality of DSMS clients 20-1 to 20-N. In a typical application, the DSMS 10 will process a vast number of input data streams 11 comprising data from e.g. sensor networks (e.g. devices sensing and transmitting values of parameters such as temperature, pressure, humidity, etc.), a telecom operator network or network traffic monitors, among other possibilities.

Each DSMS client applies its own application logic to process the received data stream, and triggers one or more actions when the processing results satisfy predetermined criteria (e.g. the values reported by one or more sensors depart from certain pre-determined ranges, or an average value of a monitored variable exceeds a threshold). An action can comprise sending a message to another application server. For example, the DSMS client may issue an instruction for sending an SMS or activating an alarm, or message towards a certain device to change an operational parameter of the device.

The DSMS 10 and the corresponding client applications 20-1 to 20-N are normally deployed in different nodes. This is done partly for performance reasons, since the assurance mechanisms implemented by the DSMSs (if any), as well as DSMS scheduling policies, would be affected if the DSMS platform also implemented the applications' logic. In this case, the CPU or memory consumption would depend not only on the CQ execution but also on other variables that are unknown or at least difficult to calculate.

The data sources generating the input data streams 11 are push-based, meaning that they are not programmed to provide data on demand or even to store some data until it is requested, but to release it as soon as new data becomes available. The DONS 10 therefore has no direct control over the data arrival rates, which can change in unpredictable ways, getting bursty at times.

The bursty nature of the incoming stream(s) can prevent DSMSs from maintaining the required tuple processing rate whilst data is being received at a high rate. As a result, a large number of unprocessed or partially processed tuples can become backlogged in the system, causing the tuple processing latency to increase and the value of the received stream data to therefore diminish. In other words, the data arrival rates can get so high that the demand on the DONS system resources (such as CPU processing capacity, memory, and/or network bandwidth) may exceed the available capacity. In this case, the DSMS will be overloaded and will not be able to process input tuples as fast as they are received. Thus, when the DSMS is overloaded, data arrives via the input data stream(s) at a higher rate than it can be processed by the DSMS using the processing resources available to it, in order to maintain a QoS required by at least client of the DSMS. Since the DSMS is required to have some capacity for handling occasional busts of data in one or more of the (inherently unpredictable) input data streams, the DSMS can also be regarded as being overloaded (and thus incapable of handling incoming bursts of data) when data arrives via the input data stream(s) at a rate which is more than a certain fraction of the rate at which incoming data can be processed by the DSMS using the processing resources available to it, in order to maintain the required QoS. For example, the DSMS could be considered overloaded when the input data rate is more than e.g. 80%, or more than 90%, of the maximum rate at which it can be processed by the DSMS, although this fraction will depend on the volatility of the data stream sources in any given DSMS application.

Unless the overload problem is resolved, tuples will continue accumulating in queues, latencies will continuously grow, and latency-base QoS will degrade. Due to the predefined QoS requirements of a CQ, query results that violate the QoS requirements may become useless, or even cause major problems as the DSMS client applications could execute wrong or inappropriate actions if they receive outdated data.

Each DSMS is responsible for monitoring data to detect critical situations. Since such overload situations are usually unforeseeable and immediate attention is critical, adapting the system capacity to the increased load by adding more resources may not be feasible or economically meaningful. An alternative way of handling overload situations is therefore required.

One known approach to dealing with such data overload situations and reducing the demand on available resources is so-called "load shedding". When the DSMS is overloaded with data from the input data stream(s), load shedding as performed, i.e. an least some of the data items (tuples) as received by the DSMS or partially processed by the DSMS are discarded in order to reduce the processing burden of the DSMS in generating its output data stream(s). In other words, load shedding involves selecting which of the tuples should be discarded, and/or in which phase of the CQ execution the tuple(s) should be dropped. The overload may be caused by an excessively high data input rate, as noted above, or any other situation arising that causes a degradation of the QoS required by a DSMS application, such as a degradation of performance conditions within the DSMS.

In any case, certain threshold limits may be predefined in the DSMS which, with regard to data rate from the input data stream(s), can establish that a degradation of its QoS performance for accomplishing with CQ execution can occur and, thus, prejudice the production of the corresponding output data stream(s). Accordingly, a DSMS can activate a "load shedding" mechanism when—among other factors that can cause an overload or malfunction on its resources— the data rate from the input data stream(s) exceeds the configured limit, and deactivate it otherwise.

The discarding of tuples from the system during load shedding preferably minimises an error in the result of the CQ execution. Such discarding of tuples is often acceptable as many stream-based applications can tolerate approximate results. However, load shedding poses a number of problems in DSMS systems.

A random load shedder simply sheds tuples at random. Although this kind of shedder is easy to implement, it has the drawback of failing to discriminate between meaningful tuples and those with no impact on the QoS provided to an application.

A semantic shedder, on the other hand, bases its decision on whether to drop a tuple on the tuple's relevance according to information statically configured in the DSMS. This requires the DSMS to be configured with a relationship between the "value" of a certain received tuple (i.e. as received from incoming streams) and its relevance for a particular client application, which is determined by a corresponding so-called "utility function". The utility function defines a static relation between the value of a tuple and the corresponding impact on the system QoS figures (latency, CPU, memory etc.) that are imposed by the DSMS client application. The utility function needs to be entered manually into the DSMS by the DSMS administrator. However, the system administrator manually configuring semantic load shedding instructions in a DSMS is required to have a deep knowledge of the client applications that receive data from the DSMS. This can be unfeasible in scenarios comprising a large and/or varying number applications, and furthermore the logic can even change over time.

In order to use the built-in mechanisms provided by the DSMS (if any), it is necessary to express the requirements (e.g. QoS requirements) of the DSMS's client application(s) with regard to the DSMS output stream(s). Specification of an appropriate utility function is a difficult task in many cases.

Firstly, some DSMS products do not include load shedding support as a built-in function. Even if they do, there are usually numerous clients in a typical practical application of a DSMS, with many clients using differing sets of output data streams. Furthermore, the client application logic might not be known when the DSMS is deployed or configured by the administrator, and can be complex and subject to frequent changes. For example, the logic of a client might also depend on data received by the client other than that received via the DSMS output stream (e.g. configuration variables), and vary with time as the client application is repeatedly updated.

In view of the considerable difficulties summarised above, several different approaches have been taken to adapting a DIMS to reliably and consistently deliver improved QoS to a variety of client applications whilst implementing a load shedding process.

One of these approaches, which is particularly applicable to multi-query processing systems executing CQs with different QoS requirements, has been to improve resource allocation by developing effective scheduling strategies. A number of scheduling strategies have been developed, some more useful for catering for the needs of a particular type of application (in terms of tuple latency, total memory requirement etc.) than others. However, the scheduling problem in a DSMS is a very complex one and efforts are ongoing to develop strategies with reduced scheduling overhead.

A further approach is to deploy several DSMS servers or instances in order to evenly distribute the incoming load among them and avoid congestion situations. However, apart from the increased deployment cost, this solution brings about synchronization and/or configuration issues. For example, since an output stream can be a result of a DSMS processing one or more input streams, devices sending input streams towards the DSMS servers should then be arranged every time a DSMS server is added. Moreover, splitting a CQ execution among several nodes is not a straightforward task (since some operators implementing the CQ execution logic might need to store a sequence of tuples) and might affect the overall QoS figures.

Despite these efforts and others, there still remains a great need to provide an improved DSMS which can reliably deliver improved QoS to a variety of client applications while implementing a load shedding process.

SUMMARY

The present inventors have conceived an elegant and highly effective dynamic load shedding scheme that addresses the above-discussed problems. As will become apparent from the following description, this load shedding scheme may be implemented as a very light-weight algorithm that requires minimal run-time overhead, allowing precious resources to be conserved while the DSMS is performing load shedding (and is therefore, by definition, under duress). In addition, unlike conventional semantic shedders which, as noted above, usually require utility functions to be frequently specified and maintained by a skilled system administrator, embodiments of the load shedding scheme described herein do not require such user input and, in some cases, require no user input at all.

A challenge faced by the inventors was to find a way of identifying which of the data input to a DSMS are likely to be of low utility to a DSMS client; in other words, to identify data in an input data stream having a lower probability than the other data input to the DSMS of causing the DSMS client to execute an action upon processing data in an output data stream of the DSMS that is based on the input data (the action comprising the sending by the DSMS client of a signal to a recipient different from the DSMS client, for example).

The solution conceived by the inventors is based on their finding that the underlying cause of the low utility of some of the input data to a DSMS is, in many and varied DSMS applications, tied to the locations of the data stream sources that generate the input data streams containing those data. Accordingly, in a DSMS according to an embodiment of the invention, a utility value is ascribed to location information associated with a set of one or more data stream sources (e.g. the location of each input data stream source, an identifier identifying an area of geographical region where a plurality of data stream sources are located, or the location of a network element processing data from the data stream source(s)) during a learning process that is performed autonomously by the DSMS during the course of its normal operation. During this learning process, the DSMS monitors the input data streams and estimates the utility to the DSMS client of data from the set of one or more data stream sources to build up what may be regarded as a "utility map" showing the utility of data from various locations/regions. When the DSMS of the embodiment subsequently encounters an overload situation, it is able to use this information to identify data sources (which may be different from the data sources monitored during the learning phase) that are associated with locations or regions classed as being of low utility, and therefore discard their data in the load shedding process. In this way, the DSMS is able to maintain high QoS during the load shedding process with little processing overhead.

More specifically, the present invention provides in one aspect a DSMS comprising a data receiving module arranged to receive an input data stream from each of a plurality of data stream sources and respective location information associated with sets of one or more of the data stream sources, and a continuous query execution module operable to execute a continuous query against data items received, via the input data streams to generate at least one output data stream for output to a client of the DSMS. The DSMS further comprises a load shedding module operable to execute a load shedding process when the DSMS is overloaded, with data from the input data streams, so as to discard some of the data items as received by the DSMS or that have been partially processed by the DSMS. The DSMS also includes a learning module operable to determine, when the DSMS is not overloaded, and for the location information associated with each of the sets of one or more data stream sources, a respective utility value indicating a utility to the client of the DSMS of data from the set of one or more data stream sources, by processing a feedback signal that is based on the at least one output data stream, the learning module being arranged to store the location information in association with the corresponding data utility value. The load shedding module is configured to control the load shedding process by using location information received by the data receiving module when the DSMS is overloaded, together with the location information and data utility values stored by the learning module, to identify one or more input data streams whose data items are to be discarded.

The present invention further provides a data stream processing system comprising a DSMS as set out above, and a DSMS client arranged to receive and process the at least one output data stream generated by the DSMS, and operable to execute an action when triggered by the processing of one or more data items in the output data stream, wherein the action comprises the sending by the DSMS client of a signal to a recipient different from the DSMS client. The data stream processing system further comprises a feedback loop arranged to convey a feedback signal to the DSMS notifying the execution, of an action by the DSMS client. The learning module of the DSMS is operable to determine, when the DSMS is not overloaded and for the location information associated with each of the sets of one or more data stream sources, a respective utility value indicating a utility to the DSMS client of data from the data stream source (a) in the set, by processing the feedback signal conveyed by the feedback loop, the learning module being arranged to store the location information in association with the corresponding data utility value.

The present invention further provides a method of processing stream data in a DSMS. The method comprising the DSMS performing the steps of: receiving an input data stream from each of a plurality of data stream sources and respective location information associated with sets of one or more of the data stream sources; executing a continuous query against data items received via the input data streams to generate at least one output data stream for output to a client of the DSMS; determining, when the DSMS is not overloaded with data from the input data streams and for the location information associated with each of the sets of one or more data stream sources, a respective utility value indicating a utility to the client of the DSMS of data from the set of one or more data stream sources, by processing a feedback signal that is based on the at least one output data stream; and storing, in association with the location information associated with each of the sets of one or more data stream sources, the corresponding data utility value. The DBMS executes a load shedding process when the DSMS is overloaded with data from the input data streams, so as to discard some of the data items as received by the DSMS or that have been partially processed by the DSMS. The load shedding process is controlled by using location information received when the DBMS is overloaded, together with the stored location information and data utility values, to identify one or more input data streams whose data items are to be discarded.

The present invention further provides a computer program product, comprising a computer-readable storage medium or a signal, carrying computer program instructions which, when executed by a processor, cause the processor to perform a method as set out above.

BRIEF DESCRIPTION OF THE DRAWINGS

Embodiments of the invention will now be explained, by way of example only, with reference to the accompanying figures, in which.

DETAILED DESCRIPTION OF EMBODIMENTS

The following describes an approach to load shedding that allows a DSMS to maintain high QoS to its clients when it is overloaded. Although specific applications of the intelligent, location-aware load shedding mechanism are described for ease of understanding of the invention, it will be appreciated that the principles described herein are of much broader applicability, and will give rise to similar advantages in any DSMS application where the utility of data from unpredictable data stream sources is (for whatever underlying reason) tied to locations that are associated with those data stream sources.

Embodiment 1

Figure 1:
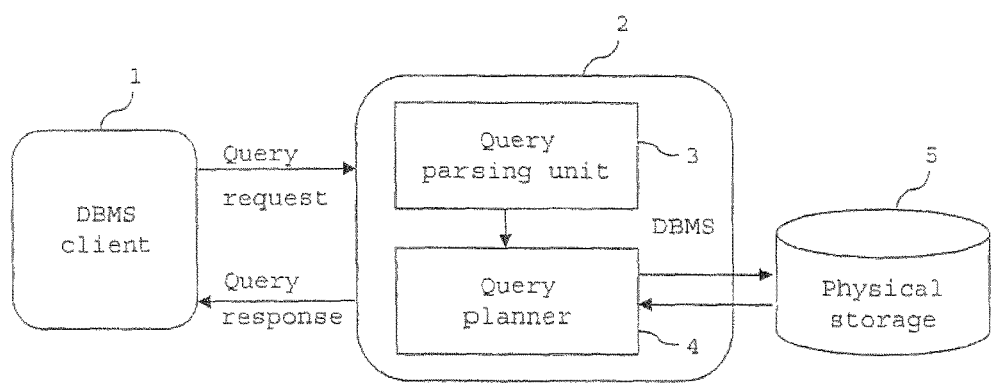
FIG. 1 illustrates the interaction in a conventional system between a DBMS client, a DBMS and a storage device of the DBMS.
Figures 2, 3:
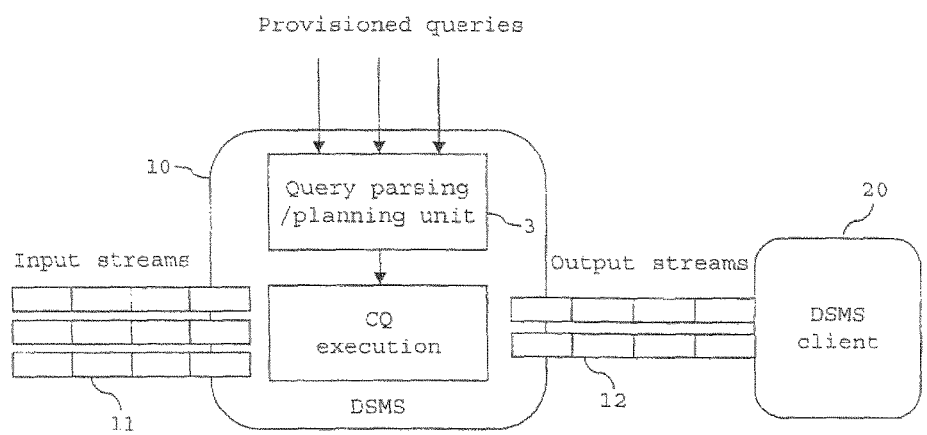
FIG. 2 shows a conventional DSMS serving a DSMS
FIG. 3 shows an example of a tuple structure in a data stream.
Figure 4:
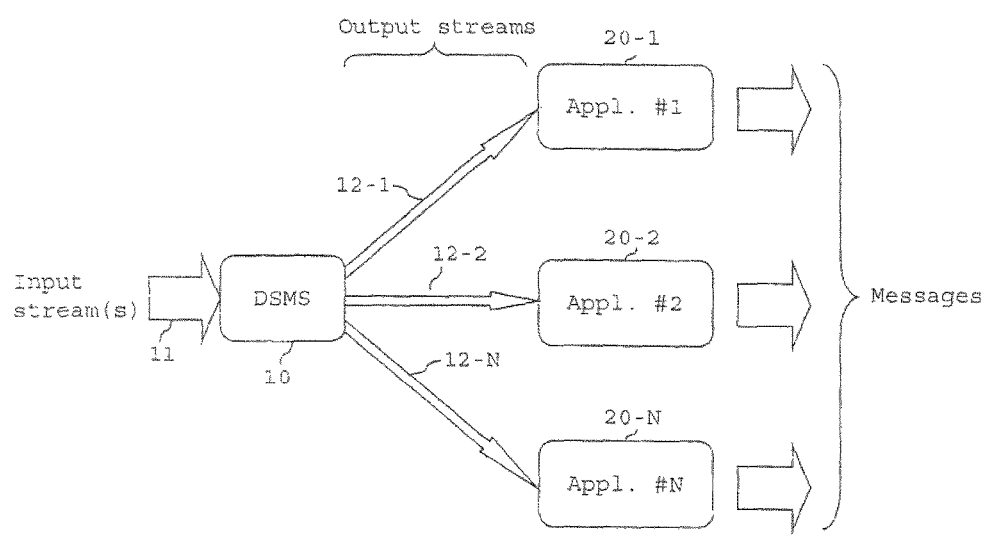
FIG. 4 shows a conventional DSMS serving a number of DSMS client applications.
Figure 5:
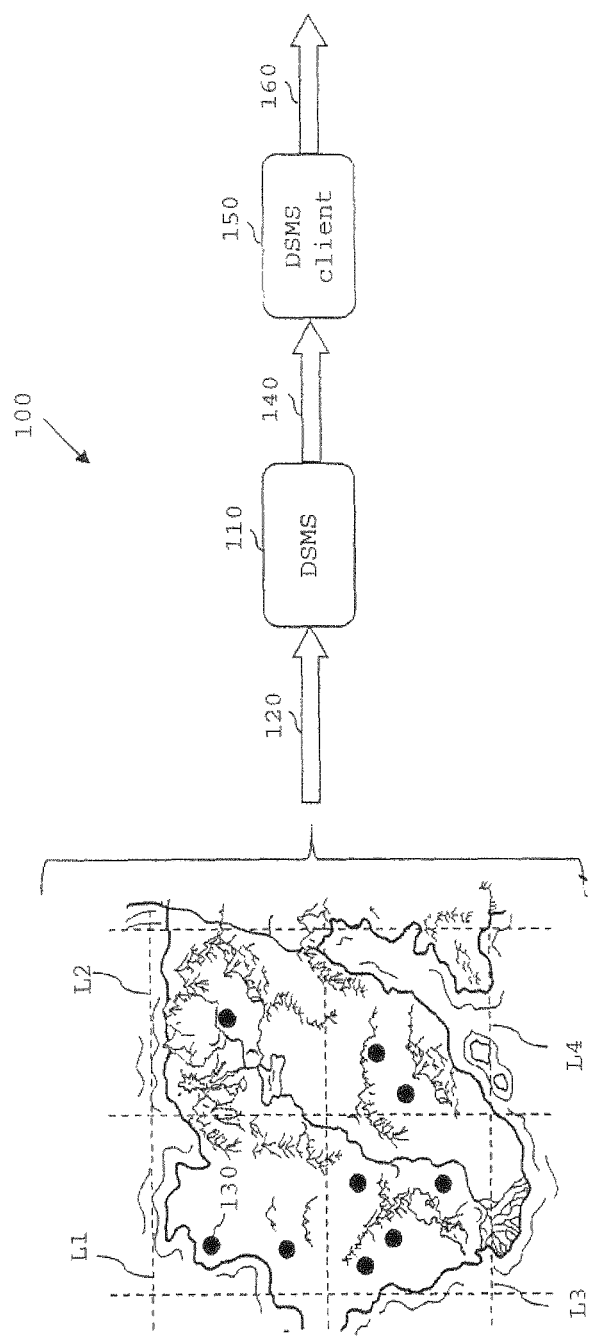
FIG. 5 shows a data stream processing system comprising a. DSMS according to a first embodiment of the present invention.

FIG. 5 shows a data stream processing system (DSPS) comprising a DSMS according to a first embodiment of the present invention. The DSPS 100 comprises a DSMS 110, which is configured to receive data items from a plurality of input data streams 120 that are generated by a plurality of data stream sources 130.

The geographical area across which the data stream sources 130 are distributed may be divided into a number of regions which, in the present embodiment, take the form of regions L1 to L4 in a grid pattern G. Located in each of the regions L1 to L4 is a set of one or more data stream sources 130. For example, region L1 contains two data stream sources, while region L2 contains only a single data stream source. Each of the regions L1 to L4 is associated with respective location information that identifies the location of the region. The location information may, for example, comprise a set of one or more identifiers (such as a grid reference) that allow the position of the region in the grid pattern to be identified. It should be noted that, although the location(s) of the data stream source(s) 130 is/are identified in the present embodiment relatively coarsely (in terms of the region in which the data stream source 130 is/are located), location information associated with each data stream source 130 may alternatively specify the point at which the respective data stream source 130 is determined to be located; in this case, the location information may comprise the coordinates of the data stream source 130 as obtained by a Global Positioning System (GPS) receiver that is located at the data stream source 130, for example.

The nature of the data sent by the data stream sources 130 to the DSMS 110 will, of course, depend on the particular application. In the present embodiment, each of the data stream sources monitors the ambient temperature and generates data items comprising a temperature reading field that contains the source's temperature reading, and a location field that contains the source's location information, and transmits these data items to the DSMS 110, as one of the data streams 120. In general, the plurality of data streams 120 (at least some which may be multiplexed) may be transmitted by the sources 130 over one or more channels, which may take any desirable form (e.g. optical fibers, coaxial cables, wireless telecommunication channels, etc.). The intervals at which temperature readings are taken and transmitted may differ between the sources 130 and may furthermore vary with time. The data streams 120 being received by the DSMS 110 will therefore be bursty, and the data flow into the DSMS 110 consequently unpredictable.

The DSMS 110 is operable to execute a continuous query against the received data items to generate at least one output data stream 140. In the present embodiment, the DSMS determines, for each of the input data streams 120, whether at least one data item in the input data stream satisfies a predetermined condition, namely that the one or more data items indicate that the temperature reported by the corresponding data source 130 is increasing faster than a predetermined rate. Where at least one data item in at least one of the input data streams 120 has been determined to satisfy the predetermined condition, the DSMS 110 outputs at least one output data stream 140 based on the at least one input data stream.

The output data stream 140 is then fed to a DSMS client 150, which processes the received data stream(s) and executes an action when triggered by the processing of one or more data items in the data stream(s) received by the DSMS client 150. In the present embodiment, the action comprises the DSMS client 150 transmitting a signal 160 to a recipient different from the DSMS client 150 when one or more temperature values in the output data stream(s) 140 indicate that the corresponding data source 130 is reading a temperature higher than a threshold that has been set for that data source 130. In general, the action may, for example, comprise the DSMS client 150 transmitting a message to a terminal across a network, for example an update request to a web server over the Internet. Alternatively, the action may comprise the DSMS client creating, deleting or otherwise modifying a record kept therein (e.g. managing a log). In the present embodiment, however, the action comprises the DSMS client 150 sending a message across a network to trigger a fire alarm.

Figure 6:
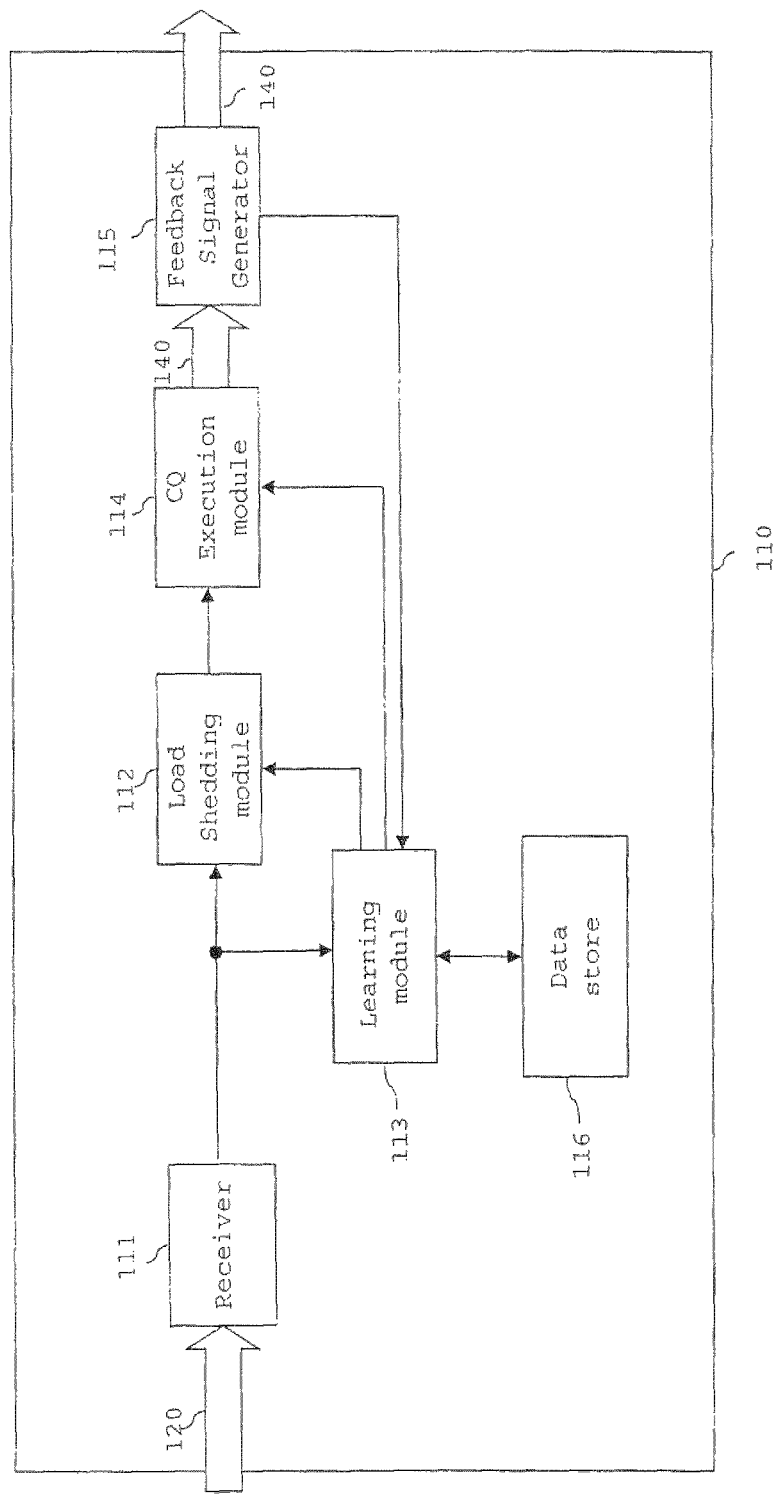
FIG. 6 shows details of the DSMS in the first embodiment.

FIG. 6 shows the features of the DSMS 110 of the present embodiment that are necessary to understand the present invention, with conventional features being omitted for clarity. In this embodiment, the DSMS 110 comprises a DSMS application deployed on a programmable signal processing apparatus, such as a server. The DSMS 110 includes a data receiving module 111, a load shedding module 112, a learning module 113, a CQ execution module 114, a feedback signal generator 115, and a data store 116.

The data receiving module 111 interfaces the data stream sources 130 sending the data streams 120 to the DSMS 110, with the remaining components of the DSMS 110. The data receiving module 111 may, as in the present embodiment, temporarily store the received data in buffers, although received data may alternatively be buffered after it has passed through the load shedding module 112 and before it is processed by the CQ execution module 114.

The data store 116 may be non-volatile memory such as a magnetic computer storage device (e.g. a hard disk) or a volatile memory such as DRAM or SRAM. The load shedding module 112, the learning module 113, the CQ execution module 114 and the feedback signal generator 115, on the other hand, comprise hardware which implements procedures that may form at least a part of a computer program, module, object or sequence of instructions executable by the programmable signal processing apparatus. These procedures, when executed by the signal processing apparatus, process stream data in a manner which will be described below.

Figure 7:
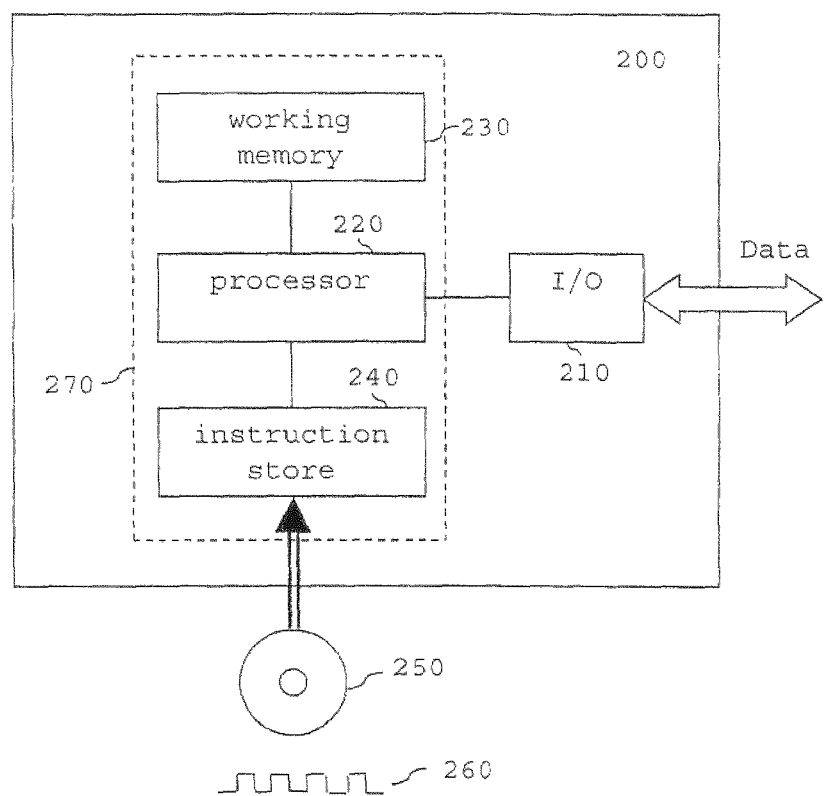
FIG. 7 illustrates an example of computer hardware capable of functioning as a DSMS.

An example of a general kind of programmable signal processing apparatus in which the DSMS may be implemented is shown in FIG. 7. The signal processing apparatus 200 shown comprises an input/output section 210, a processor 220, a working memory 230, and an instruction store 240 storing computer-readable instructions which, when executed by the processor 220 cause the processor 220 to perform the processing operations hereinafter described to process stream data in the DSMS 110.

The instruction store 240 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 240 may comprise a volatile memory (e.g. DRAM or SRAM), and the computer-readable instructions can be input thereto from a computer program product, such as a computer-readable storage medium 250 (e.g. an optical disc such as a CD-ROM, DVD-ROM etc.) or a computer-readable signal 260 carrying the computer-readable instructions.

The working memory 230 functions to temporarily store data to support the processing operations executed in accordance with the processing logic stored in the instruction store 240. As shown in FIG. 7, the I/O section 210 is arranged to communicate with the processor 220 so as to render the signal processing apparatus 200 capable of processing received signals and communicating its processing results.

In the present embodiment, the combination 270 of the processor 220, working memory 230 and the instruction store 240 (when appropriately programmed by techniques familiar to those skilled in the art) together constitute the load shedding module 112, the learning module 113, the CQ execution module 114 and the feedback signal generator 115 of the DSMS 110. The combination 270 also performs the other operations of the DSMS 110 that are described herein.

The operations performed by the DSMS 110 of the present embodiment to process stream data and implement a dynamic load shedding mechanism will now be described with reference to FIG. 8.

Figure 8:
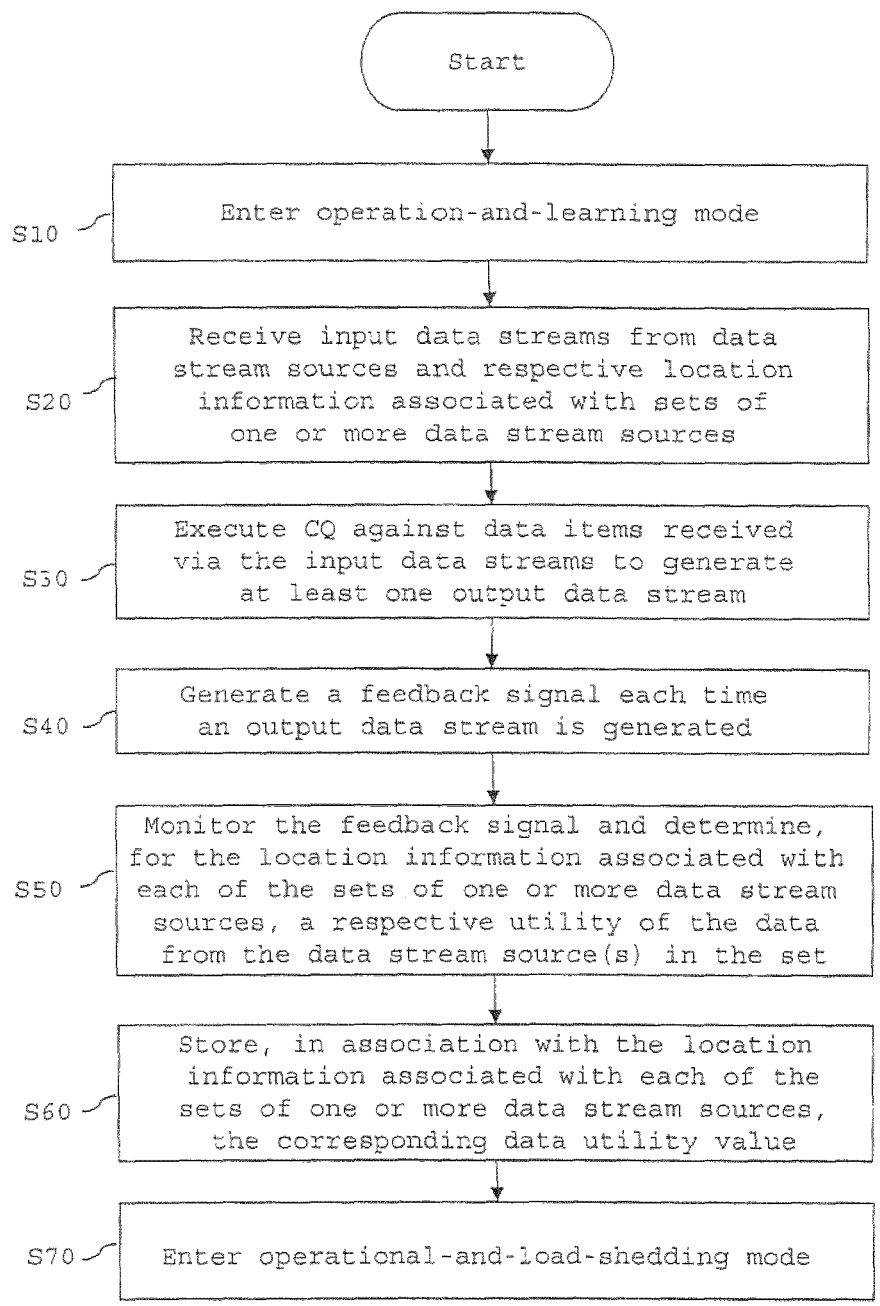
FIG. 8 shows a method of processing data in the DSMS of the first embodiment.

Referring to FIG. 8, in step S10, the DSMS 110 begins operating in an operation-and-learning mode (also referred to herein as the "learning mode"), during which the CQ execution module 114 executes a CQ against data items from the input stream 120, and the learning module 113 of the DSMS 110 determines, for the location information associated with each of the sets of one or more data stream sources 130, a respective utility value of data from the set of one or more data stream sources 130. The DSMS 110 operates in the operation-and-learning mode when it detects that a threshold level of query processing congestion has not been reached or exceeded, specifically when the data rate (or an average data rate) from the input data streams 120 is below a certain limit that provides substantially no degradation of a Quality-of-Service figure that is required for the continuous query being executed by the DSMS 110.

Operation in the learning mode can be instigated by a command from the system administrator, or may be started autonomously by the DSMS 110. The DSMS 110 preferably operates in the learning mode only whenever it determines that the rate (or an average rate) at which data items are received via the input data streams 120 is sufficiently low (i.e. below a predetermined limit) for the operation of the DSMS 110 in the learning mode to provide substantially no degradation (i.e. no degradation or a level of degradation that does not affect the functionality of the DSMS client 150) of a QoS figure (in terms of tuple latency, for example) that is required for the continuous query being executed by the CQ execution module 114. In this way, the DSMS 110 can ensure that the execution of the learning process will not impact on the performance of its normal CQ execution.

As part of the learning process, the data receiver 111 receives, in step S20, an input data stream from each of a plurality of data stream sources 130. As noted above, the data items (tuples) in each of the input data streams 120 comprise an identifier whose value allows the location information associated with the data stream source 130 generating the input data stream to be determined. More specifically, in this embodiment, the tuples in each received input data stream comprise geographical coordinates which define the point at which the respective data stream source 130 is located at the time of transmission. The data stream source 130 may, for example, be programmed by a user to transmit a desired set of coordinates. However, if the data stream source 130 is mobile and manual updating of its coordinates would be impractical or undesirable, it may be preferable for the coordinates to be obtained automatically, for example by a GPS receiver connected to the data stream source 130.

In step S30, the CQ execution module 114 executes a continuous query against data items received via the input data streams 120 to generate at least one output data stream 140 for output to the DSMS client 150. In the present embodiment, the CQ execution module 114 executes the continuous query by determining, for each of the input data streams 120, whether at least one data item in the input data stream satisfies a predetermined condition and, where at least one data item in at least one of the input data streams 120 has been determined to satisfy the predetermined condition, outputting at least one output data stream 140 based on those one or more input data streams.

By way of example, in the present embodiment, the predetermined condition is that the one or more data items received in an input data stream indicate that the temperature reported by the corresponding data source 130 is increasing faster than a predetermined rate, which may be indicative of the onset of a fire at the corresponding data source location (i.e. at one or more of regions L1 to L4, as the case may be). Where one or more temperature field values in tuples of at least one of the input data streams 120 has been determined to satisfy this condition (e.g. where there is a large jump from one temperature reading to the next, or a rapid temperature change is apparent from a larger number of readings), then the DSMS 110 outputs at least one output data stream 140 based on those one or more input data streams. In the present embodiment, the DSMS 110 simply forwards to its client 150 any input data stream whose data item(s) satisfy the predetermined condition, such that the one or more output data streams 140 still include the coordinates identifying a point where each of one or more data stream sources 130, on whose data the at least one output data stream 140 is based, is located.

It should be noted that the CQ execution module 114 need not function as a filter for the input data stream, as in the present embodiment; the CQ execution module 114 may, in general, further process incoming stream(s) whose data item(s) satisfy the predetermined condition, for example by modifying one or more tuple field values, and/or by adding or removing one or more tuple fields.

In step S40, the feedback signal generator 115 receives the one or more data streams 140 output by the CQ execution module 114, and generates a feedback signal that is then fed back to the learning module 113. The feedback signal generator generates the feedback signal each time it receives a data stream 140 from the CQ execution module 114. In broadest terms, the feedback signal is such that it allows the location information associated with at least one data stream source 130, on whose data the at least one output data stream 140 is based, to be identified. In the present embodiment, the feedback signal generated by the feedback signal generator 115 feeds back to the learning module 112 an identifier that allows location information associated with at least one data stream source 130, on whose data the at least one output data stream 140 is based, to be identified. More specifically, in this embodiment, this identifier comprises the location coordinates, which the feedback signal generator 115 extracts from the output data stream 140. Thus, the learning module 113 receiving these coordinates is able to identify the location information (in the present example, one of regions L1 to L4) associated with the data stream source 130 whose data stream appears to be of relevance to the DSMS client 150.

The learning module 113 monitors the feedback signal generated by the feedback signal generator 115 (in step S50), and determines the number of times the CQ execution module 114 generates an output data stream for the location information associated with each of the sets of one or more data stream sources 130 provided in regions L1 to L4. By monitoring the feedback signal in this way for a sufficiently long period of time, the learning module 113 is able to determine, for the location information associated with each of the sets of one or more data stream sources 130, a respective utility of the data from the data stream source(s) 130 in the set to the DSMS client 150, based on how frequently the data in the input data stream(s) 120 from the set of one or more data stream sources 130 causes an output data stream to be output by the CQ execution module 114. Thus, the more frequently a data source associated with certain location information causes an output to be generated by the CQ execution module 114, the more likely that data is to be of relevance/utility to the DSMS client 150. Conversely, a region (one of L1 to L4 in FIG. 5) containing one or more data stream sources 130 that rarely report a rapidly increasing temperature is deemed to be a low fire risk area and data from this region is therefore assigned a low utility for the DSMS client 150. Accordingly, low utility data from data sources in such a region can be discarded by the load shedding module 112 at times of data shedding in preference to higher utility data from other regions, which is more likely to trigger a response in the DSMS client 150.

Thus, during operation of the DSMS 110 in the operation-and-learning mode, the learning module 113 assigns utility values to each of the regions L1 to L4 and, in step S60, stores in the data store 116 the region identifiers (being an example of location information) in association with the corresponding utility values that have been determined in step S50. The load shedding module 112 is subsequently able to use this stored information to control the load shedding process when the DSMS 110 is overloaded.

The data processing operations conducted in the operation-and-learning mode as described above preferably continue while the rate of receiving data via the input data streams 120 is sufficiently low for the operation of the DSMS 110 in the learning mode to provide substantially no degradation of a QoS figure that is required for the continuous queries being executed.

During operation in the learning mode, the DSMS 110 may receive one or more bursts of data via at least some of the input data streams 120, which may cause the buffers in the data receiving module 111 to overflow. Increasing the buffer size is not always possible or feasible in both technical and economic terms. The data bust(s) can therefore lead to a backlog of data items in the buffers that cannot be cleared by the CQ execution module 114 whilst maintaining a QoS required by the DSMS client 150. Under these circumstances, to prevent buffer overflow, the DSMS 110 starts to operate in the operational-and-load-shedding mode (in step S70), performing the load shedding process when overloaded with data from the input data streams 120. In order to be able to judge whether to perform load shedding, and how much of the load needs to be shed, the DSMS 110 makes use of a system load estimation process performed by the load shedding module 112 to estimate the computation load based on current input rates of the data streams and characteristics of active continuous query (or queries). Upon detecting excessive query processing congestion, the DSMS 110 uses the load shedding module 112 to compute the optimal placement of load shedders that minimises the error introduced and to otherwise configure the load shedding process. Various approaches to detecting query processing congestion and optimising the placement of load shedders along operator paths will be familiar to those skilled in the art, such that a further explanation is unnecessary here.

During the load shedding process, the DSMS 110 selects which tuples of incoming stream(s) 120 should be discarded before or during CQ execution. As described earlier, this process can be triggered in the DSMS 110 when the data rate in the incoming stream(s) 120 exceeds a certain limit that can prevent the normal performance of the CQ execution process. The process steps performed by the load shedding module 112 of the DSMS 110 during the load shedding process will now be described.

Firstly, the input data streams 120 are received by DSMS 110. The same considerations as described earlier for the learning process apply. Most DSMS implementations allow system programmers to define operators for processing the data in the incoming streams (e.g. by means of either a standard language, such as Java, or a proprietary one) in the same way as the operators used in a normal CQ execution. The load shedding module 112 depicted in FIG. 6 may be implemented using this technique.

Incoming tuples are then evaluated by the load shedding module 112. The logic is as follows: If the DSMS load is below a pre-defined threshold, then the load shedding module 112 is inactive and the DSMS proceeds with the CQ execution (i.e. tuples extracted from incoming data streams 120 are processed by the CQ execution module 114, and the corresponding output stream(s) 140 is/are produced and sent towards the DSMS client 150). The load shedding module 112 may obtain information about the current system load via information available from the operating system. On the other hand, when the DSMS load is at or above the threshold, the load shedding module 112 controls the load shedding process by using location information received by the data receiving module when the DSMS is overloaded (which may relate to data stream sources 130 whose outputs were not monitored during the learning phase, e.g. newly added data stream sources), together with the location information stored in the data storage 116 in association with the respective data utility values, to identify one or more input data streams whose data items are to be discarded.

In the present embodiment, the DSMS 110 continually monitors the data rate from the input data streams 120 and changes from operating in the operational-and-load-shedding mode to operating in the operational-and-learning mode when the DSMS 110 is no longer overloaded with data from the input data streams 120. Thus, the DSMS switches from operating in one of the operational-and-learning mode and operational-and-load-shedding mode to the other mode, depending on whether it is in an overloaded state.

By carrying out the utility value learning process, which is preferably executed by the DSMS whenever it is not overloaded, the DSMS 110 ensures that it keeps track of any changes to the "importance" (i.e. utility) of the geographical locations of the data sources that is stored in the data store 116.

Utility values that are determined according to embodiments of the invention can comprise, for example, numeric values, so that a first determined utility value can be computed as higher or lower than a second determined utility value. Accordingly, the load shedding process executed by a DSMS can be driven by comparing the values of the determined utility values to each other and/or with a certain utility threshold value (e.g. wherein said threshold defines a certain frequency for generating output data streams based on input data streams received from certain data sources).

Modifications and Variations of Embodiment 1

In the first embodiment described above, an identifier in the form of geographical coordinates of a data source 130 is transmitted by each data source 130 and used by the learning module 112 to determine, for the location information associated with each of the sets of one or more data stream sources 130, a respective utility value indicating a utility to the DSMS client 150 of data from the set of one or more data stream sources 130. However, it should be noted that another form of identifier may alternatively be used. For example, the data stream sources 130 may generate tuples having data stream identifier fields that contain data stream identifier values, rather than data source location coordinates. In this modification of the first embodiment, the DSMS 110 also receives (via an input stream or through another channel) information associating stream identifier values with the locations of the data stream sources 130 generating the respective data streams, and stores these associations in the data store 116, for example in the form of a table. Thus, in this modification, one or more data stream identifier values are stored in association with each item of location information (e.g. each identifier that identifies one or regions L1 to L4). When operating in the operation-and-learning mode, the DSMS 110 performs an additional step of looking up the location information associated with the data stream source on whose data stream the output stream of the CQ execution module 114 is based.

In the first embodiment, the feedback signal generated by the feedback signal generator 115 comprises an identifier that enables the learning module 113 to identify location information associated with at least one data stream source 130 on whose data the at least one output data stream 140 is based. However, the feedback signal need not include such an identifier, and may allow the learning module 113 to otherwise identify location information associated with at least one data stream source 130 on whose data the output data stream(s) 140 is/are based.

For example, in a variant of the above embodiment, wherein the data stream sources 130 do not include their location information in the data streams that they generate, the learning module is arranged to determine the data stream source(s), on whose data an output data stream is based, by determining the input data streams that were received or processed in a predetermined time interval immediately preceding the receipt of the feedback signal by the learning module. In this case, the feedback signal conveys no identifying information, and instead serves to inform the learning module that an (unidentified) output data stream has been generated or output by the CQ execution module 114.

Figure 9:
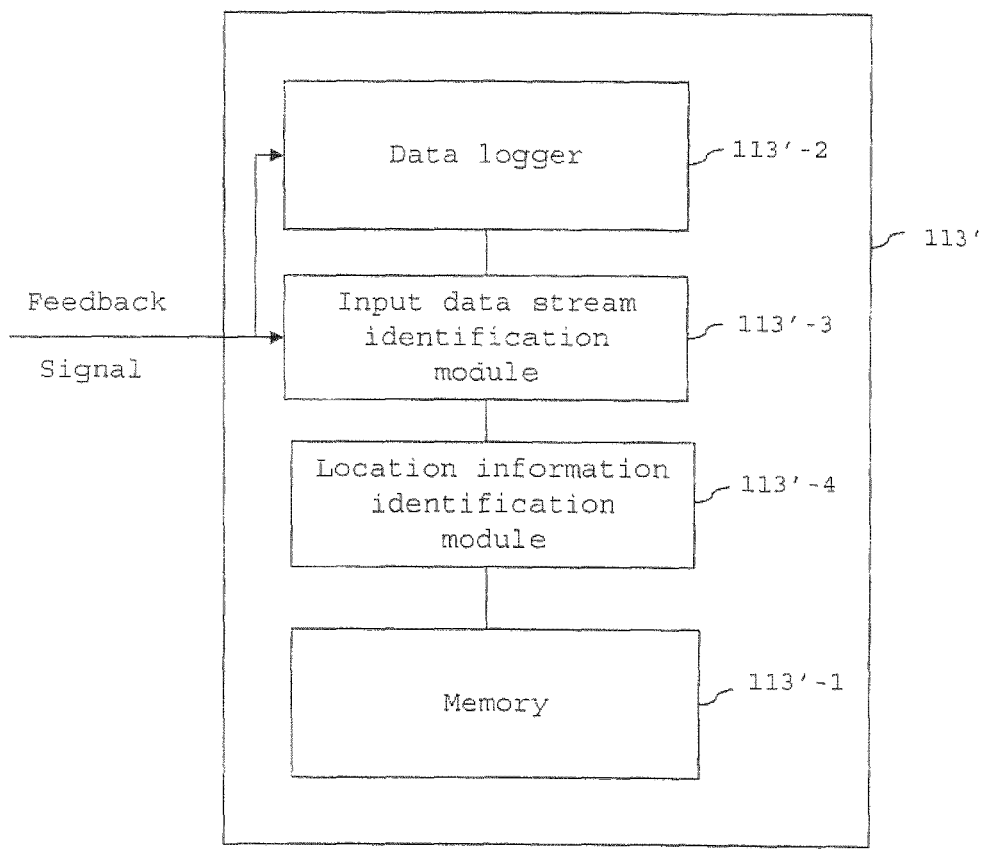
FIG. 9 shows a modified learning module in a variant of the first embodiment.

Such a variant of the first embodiment may comprise a modified learning module 113' as shown in FIG. 9. The modified learning module 113' comprises a memory 113'-1, a data logger 113'-2, an input data stream identification module 113'-3, and a location information identification module 113'-4, which are operatively connected to one another as shown in FIG. 9 and operate as follows.

The memory 113'-1 stores, for each of the input data streams 120, an input data stream identifier in association with the location information of the data stream source 130 generating the input data stream. The location information and associated input stream identifiers may be entered by a user of the DSMS who is aware of the origin of the data streams entering the DSMS, for example.

The data logger 113'-2 logs times of arrival (at the DSMS 110 or any component thereof that processes the data in the data stream 120 before the data is processed by the CQ execution module 114), or times of processing, of data items received via each of the input data streams 120, by associating a time stamp with each data item.

The input data stream identification module 113'-3 uses the times logged by the data logger 113'-2 to identify one or more input data streams via which at least one data item was received or processed in the predetermined time interval immediately prior to receipt of the feedback signal by the learning module 113'.

The location information identification module 113'-4 then identifies, using the identified one or more input data streams and the location information and associated input data stream identifiers stored in the memory 113'-1, the location information associated with at least one data stream source on whose data the at least one output data stream 140 is based. The learning module 113' determines, for the location information associated with each set of one or more data stream sources, a respective utility of the data from the data stream source(s) in the set, by monitoring how frequently the location information identification module 113'-4 identifies said location information based on the received feedback signal.

Embodiment 2

The first embodiment and the modifications and variations thereof described above exploit the correlation that often exists between the utility of data from data stream sources and the geographical locations of those sources. The inventors have further observed that, for DSMS applications involving moving data stream sources, the movements of those sources are in many cases constrained to follow predefined mobility patterns. For example, where the data stream sources are mobile telecommunication devices (e.g. mobile phones), their movements follow movement patterns (in other words, trajectories or paths) that are determined by the constraints placed on the mobility of their users. In the case of mobile phones, for example, their city-based users are often constrained to follow routes defined by the layout of the city streets.

The inventors have realised that the location-based load shedding mechanism and the modifications and variations thereof described above can, independently of the first embodiment, or in addition to it, be adapted to exploit the predictive potential of mobility patterns. More specifically, the inventors have realised that the utility of data generated by a moving data stream source as it follows a known mobility pattern, which pattern is associated with a known or learned variation of data utility with position along the pattern, will vary in a predicable way. A DSMS can exploit this when executing the load shedding process, by deciding to shed data from a moving data source whose mobility pattern is associated with a low and/or decreasing data utility with progress along the pattern.

Features of the second embodiment can be implemented as complementary to those of the first embodiment, but also can be implemented as independent features. The second embodiment differs from the first embodiment in certain respects that will now be described in detail. In particular, the second embodiment comprises determining a utility value in respect of a DSMS client with regard to data— received and processes by the DSMS—from a moving data stream source and of its mobility pattern.

Some of the features of the second embodiment are the same as those of the first embodiment, and their description will therefore not be repeated. Similarly, the above-described modifications and variations of the first embodiment are also applicable for the second embodiment.

In the second embodiment, at least some of the data stream sources 130 are mobile, and the location information associated with each moving data stream source 130 identifies a plurality of locations of the moving data stream source at different respective times, such that the location information for each of the moving data stream sources defines a mobility pattern of the data stream source 130.

In the present embodiment, the learning module 113 monitors the movement of the moving data stream sources 130 and, in a preliminary mobility pattern learning phase, correlates monitored patterns of movement to learn a set of mobility patterns which the moving data streams source(s) have been observed to follow more than once. A learned mobility pattern may have been followed more than once by the same data stream source 130, or one or more times by each of two or more different data stream sources 130.

When a moving data stream source 130 is subsequently determined to be following one of the learned mobility patterns then, in a modification of step S50 of the first embodiment, the learning module 113 determines, when the DSMS 110 is not overloaded and for the mobility pattern being followed, a respective utility value indicating a utility to the DSMS client 150 of data from the moving data stream source 130. The, in a modified step S60, the learning module 113 stores the mobility pattern in association with the corresponding data utility value in the data store 116.

During operation of the DSMS 110 in the operational-and-load-shedding mode, the load shedding module 112 controls the load shedding process by using location information received by the data receiving module 111 to determine, for each of the moving data stream sources 130, whether the moving data stream source is following a mobility pattern stored in the data store 116 and, if so, determines from the data utility value stored in association with the mobility pattern being followed whether data items in the corresponding input data stream are to be discarded.

Modifications and Variations of Embodiment 2

In a modification of the second embodiment, which also takes into account the direction or sense in which a mobility pattern is being followed, the learning module 113 determines in step S50, for the mobility pattern associated with each moving data stream source: (i) a respective first utility value indicating a utility of data generated by the moving data stream source 130 when the moving data stream source is following the mobility pattern in a first direction; and (ii) a respective second utility value indicating a utility of data generated by the moving data stream source 130 when the moving data stream source is following the mobility pattern in a second direction substantially opposite to the first direction. Then, in a variation of step S60, the learning module 113 stores the mobility pattern for each moving data stream source 130 in association with the corresponding first and second data utility values and indicators of the first and second directions that are associated with the first and second data utility values, respectively.

During operation of the DSMS 110 in the operational-and-load-shedding mode, the load shedding module 112 controls the load shedding process by using location information received by the data receiving module 111 when the DSMS 110 is overloaded to determine, for each of the moving data stream sources 130, whether the moving data stream source is following a learned mobility pattern and, if so, the direction in which the mobility pattern is being followed. The load shedding module 112 then determines from the data utility value stored in association with the mobility pattern and direction being followed whether data items in the corresponding input data stream are to be discarded.

Embodiment 3

Figure 10:
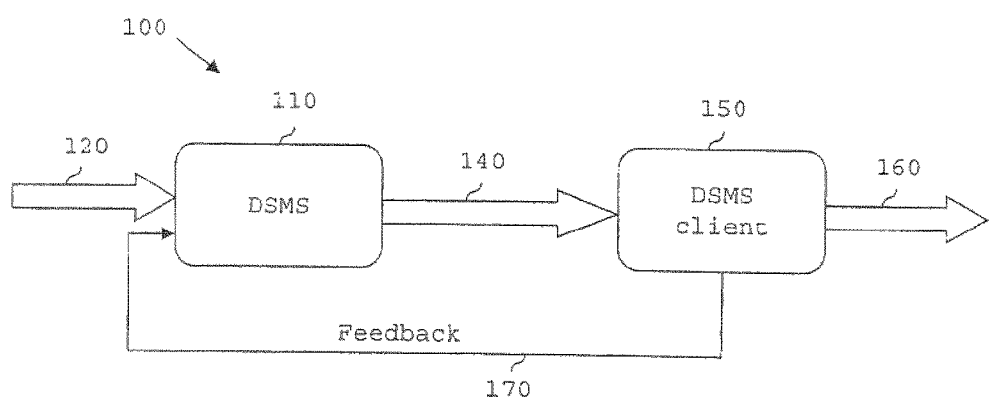
FIG. 10 shows a data stream processing system having a DSMS and a DSMS client, according to a third embodiment of the present invention.

FIG. 10 shows a data stream processing system according to a third embodiment of the present invention.

In the first and second embodiments described above, a feedback signal generator 115 is provided as part of DSMS 110 in order to provide the feedback signal to learning module 113. However, the feedback signal to learning module 113 may be generated in different ways.

For example, in the third embodiment, feedback signal generator 115 is omitted from DSMS 110 and the feedback signal to learning module 113 is generated by DSMS client 150, as shown in FIG. 10.

The DSMS client 150 requires the one or more output data streams 140 generated by the DSMS 110. The DSMS client 150 processes the received data stream(s) and is arranged to execute an action when the data in the received data stream(s) is of significance. The action comprises sending a signal 160 to a recipient different from the DSMS client. This signal may take different forms, such as a trigger signal to cause the recipient to take predetermined action or data to be stored in a recipient database.

The data stream processing system of the third embodiment includes a feedback loop arranged to convey a feedback signal 170 to learning module 113 within DSMS 110 notifying the learning module 113 of the execution of an action by the DSMS client 150.

Thus, in operation, the learning module 113 receives a feedback signal in response to the DSMS client 150 executing an action upon processing one or more data items in received output data stream(s) 140, which have been generated by the DSMS 110 executing a CQ against one or more data items input thereto in input data stream(s) 120.

The other components and operations of the DSMS 110 are the same as those described above in the first and second embodiments, and accordingly will not be described again here.

Further details of providing a feedback signal to a DSMS in accordance with an action taken by a DSMS client can be found in WO 2012/084051 A1, the full contents of which are incorporated herein by cross-reference.

Modifications and Variations of all Embodiments

Many modifications and variations can be made to the embodiments described above.

For example, in the embodiments described above the load shedding module 112, the learning module 113 and the CQ execution module 114 of the DSMS 110 are each provided using programmable processing apparatus 200 having a processor 220 which provides the respective functions of these components by executing software instructions stored in instructions store 240. However, it will be appreciated that each or all of the aforementioned components may be implemented in dedicated hardware.

The load shedding module 112 has been described as a separate module that precedes the CQ execution module 114 in the stream data processing path. However, those skilled in the art will appreciate that other arrangements are possible. For example, the functionality of the load shedding module 112 may be incorporated into the CQ execution module 114, such that tuples are shed at a stage of the query plan other than its beginning.

The invention claimed is:

1. A data stream management system, DSMS, comprising:
a data receiving module configured to receive:
an input data stream from each of at least one of a plurality of data stream sources and a plurality of moving data stream sources; and
respective location information associated with sets of at least one or more of the data stream sources and location information of the plurality of the moving data stream sources at different times respectively, such that the location information for each of the plurality of moving data stream sources defines a mobility pattern of the data stream source;
a continuous query execution module configured to execute a continuous query against data items received via the input data streams to generate at least one output data stream for output to a client of the DSMS;
a load shedding module configured to execute a load shedding process when the DSMS WO is overloaded with data from the input data streams so as to discard a plurality of the data items comprising at least one of:
as received by the DSMS; and
that have been partially processed by the DSMS; and
a learning module configured to determine, when the DSMS is not overloaded and for the location information associated with each of the sets of one or more of the at least one data stream source and each moving data stream source, a respective utility value indicating a utility to the client of the DSMS of data from the set of the at least one or more data stream source and the moving data stream source, by processing a feedback signal that is based on the at least one output data stream, the learning module being configured to store the location information in association with the corresponding data utility value, wherein the learning module is configured to store the mobility pattern in association with a corresponding data utility value,
wherein the load shedding module is being configured to control the load shedding process by using location information received by the data receiving module when the DSMS is overloaded, together with the location information and data utility values stored by the learning module,
to identify at least one or more input data streams whose data items are to be discarded,
to determine, for each of the moving data stream sources, whether the moving data stream source is following a mobility pattern stored by the learning module, and
if the moving data stream source is following the mobility pattern, to determine from the data utility value stored in association with the mobility pattern being followed whether data items in the corresponding one or more input data streams are to be discarded.

2. The data stream management system according to of claim 1, wherein the learning module is configured to:
determine, when the DSMS is not overloaded and for the mobility pattern associated with each moving data stream source:
a respective first utility value indicating a utility to the client of the DSMS of data generated by the moving data stream source when the moving data stream source is following the mobility pattern in a first direction; and
a respective second utility value indicating a utility to the client of the DSMS of data generated by the moving data stream source when the moving data stream source is following the mobility pattern in a second direction substantially opposite to the first direction; and
store the mobility pattern for each moving data stream source in association with the corresponding first and second data utility values and indicators of the first and second directions that are associated with the first and second data utility values, respectively; and
wherein the load shedding module is configured to control the load shedding process by using location information received by the data receiving module when the DSMS is overloaded to determine, for each of the moving data stream sources, whether the moving data stream source is following a mobility pattern stored by the learning module and, if so, the direction in which the mobility pattern is being followed, and to determine from the data utility value stored in association with the mobility pattern and direction being followed whether data items in the corresponding input data stream are to be discarded.

3. The data stream management system of claim 1, wherein:
the continuous query execution module is configured to execute the continuous query by determining, for each of the input data streams whether at least one data item in the input data stream satisfies a predetermined condition and, where at least one data item in at least one of the input data streams has been determined to satisfy the predetermined condition, outputting output at least one output data stream based on the at least one input data stream;
the DSMS WO further comprises a feedback signal generator which is configured to generate, each time at least one data stream 040 is one of generated and output by the continuous query execution module, a feedback signal that enables the learning module to identify location information associated with at least one data stream source on whose data the at least one output data stream is based; and
the learning module is configured to monitor the feedback signal and determine, for the location information associated with each of the sets of at least one of more data stream sources source, a respective utility of the data from the at least one data stream source in the set to the DSMS client, based on how frequently the data in the at least one input data stream(s) stream from the set of at least one more data stream sources source causes the continuous query execution module to output a data stream.

4. The data stream management system of claim 3, wherein:
the feedback signal generated by the feedback signal generator comprises an identifier that enables the learning module to identify location information associated with at least one data stream source on whose data the at least one output data stream is based; and
the learning module is configured to determine, for the location information associated with each set of one or more at least one data stream source, a respective utility of the data from the at least one data stream source(s) source in the set, by monitoring how frequently the learning module identifies said location information based on the received identifier.

5. The data stream management system of claim 4, wherein:
each input data stream received by the data receiving module comprises geographical coordinates identifying a point where the respective data stream source is located;
the at least one output data stream comprises geographical coordinates each identifying a point where each of one or more data stream sources, on whose data the at least one output data stream is based, is located; and
the identifier in the feedback signal generated by the feedback signal generator comprises the geographical coordinates from the output data stream.

6. The data stream management system of claim 3, wherein the learning module is configured to determine the at least one data stream source, on whose data an output data stream is based, by determining the input data streams that were one of received and processed in a predetermined time interval prior to receipt of the feedback signal by the learning module.

7. The data stream management system of claim 6, wherein the learning module comprises:
a memory for storing, for each of the input data streams, an input data stream identifier in association with the location information of the data stream source generating the input data stream;
a data logger for logging times of arrival or processing of data items received via each input data stream;
an input data stream identification module configured to identify, using the times logged by the data logger, at least one more input data stream via which at least one data item was one of received and processed in the predetermined time interval prior to receipt of the feedback signal by the learning module; and
a location information identification module configured to identify, using the identified at least one more input data steam and location information and associated input data stream identifiers stored in the memory, the location information associated with at least one data stream source on whose data the at least one output data stream is based,
wherein the learning module is configured to determine, for the location information associated with each set of at least one data stream source, a respective utility of the data from the at least one data stream source in the set, by monitoring how frequently the location information identification module identifies said location information based on the received feedback signal.

8. The data stream management system of claim 1, wherein the DSMS is configured in:
an operational-and-learning mode to execute the continuous query against data items received via the input data streams, and determine, for the location information associated with each of the sets of at least one data stream source, a respective utility value of data from the set of at least one data stream source when the data rate from the input data streams is below a certain limit that provides substantially no degradation of a Quality-of-Service figure that is required for the continuous query being executed by the DSMS; and
an operational-and-load-shedding mode to perform the load shedding process when the data rate from the input data streams exceeds said limit, the load shedding process being performed in accordance with the data utility values determined during the operational-and-learning mode,
wherein the DSMS is configured to continually monitor the data rate from the input data streams; and change from operating in the operational-and-load-shedding mode to operating in the operational-and-learning mode when said data rate decreases to below said limit.

9. A data stream processing system, comprising:
DSMS comprising:
a data receiving module configured to receive:
an input data stream from each of at least one of a plurality of data stream sources and a plurality of moving data stream sources; and
respective location information associated with sets of at least one or more of the data stream sources and location information of the plurality of the moving data stream sources at different times respectively, such that the location information for each of the plurality of moving data stream sources defines a mobility pattern of the data stream source;
a continuous query execution module configured to execute a continuous query against data items received via the input data streams to generate at least one output data stream for output to a client of the DSMS;
a load shedding module configured to execute a load shedding process when the DSMS is overloaded with data from the input data streams, so as to discard a plurality of the data items comprising at least one of:
as received by the DSMS; and
that have been partially processed by the DSMS; and
a learning module configured to determine, when the DSMS is not overloaded and for the location information associated with each of the sets of the at least one data stream source and each moving data stream source, a respective utility value indicating a utility to the client of the DSMS of data from the set of the at least one data stream source and the moving data stream source, by processing a feedback signal that is based on the at least one output data stream, the learning module being configured to store the location information in association with the corresponding data utility value, wherein the learning module is configured to store the mobility pattern in association with the corresponding data utility value,
wherein the load shedding module being configured to control the load shedding process by using location information received by the data receiving module when the DSMS is overloaded, together with the location information and data utility values stored by the learning module,
to identify at least one input data stream whose data items are to be discarded,
to determine, for each of the plurality of moving data stream sources, whether the moving data stream source is following a mobility pattern stored by the learning module, and
if the moving data stream source is following the mobility pattern, to determine from the data utility value stored in association with the mobility pattern being followed, whether data items in the corresponding one or more input data streams are to be discarded; and
a DSMS client configured to receive and process the at least one output data stream generated by the DSMS, and configured to execute an action when triggered by the processing of at least one data item in the output data stream, the action comprising the sending by the DSMS client of a signal to a recipient different from the DSMS client; and a feedback loop configured to convey a feedback signal to the DSMS notifying the execution of an action by the DSMS client;

the learning module of the DSMS is configured to determine, when the DSMS is not overloaded and for the location information associated with each of the sets of at least one data stream source, a respective utility value indicating a utility to the DSMS client of data from the at least one data stream source in the set, by processing the feedback signal conveyed by the feedback loop, the learning module being configured to store the location information in association with the corresponding data utility value.

10. A method of processing stream data in a data stream management system, DSMS, the method comprising the DSMS:

receiving an input data stream from each of at least one of a plurality of data stream sources and a plurality of moving data stream sources and respective location information associated with sets of at least one or more of the data stream sources and location information of the plurality of the moving data stream sources at different times respectively, such that the location information for each of the plurality of moving data stream sources defines a mobility pattern of the data stream source;

executing a continuous query against data items received via the input data streams to generate at least one output data stream for output to a client of the DSMS;

determining, when the DSMS is not overloaded with data from the input data streams and for the location information associated with each of the sets of at least one data stream source and each moving data stream source, a respective utility value indicating a utility to the client of the DSMS of data from the set of at least one data stream source and the moving data stream source, by processing a feedback signal that is based on the at least one output data stream;

storing, in association with the location information associated with each of the sets of at least one data stream source the corresponding data utility value and the mobility pattern in association with the corresponding data utility value; and executing a load shedding process when the DSMS is overloaded with data from the input data streams, so as to discard a plurality of the data items comprising at least one of as one of received by the DSMS and that have been partially processed by the DSMS, the load shedding process being controlled by using location information received when the DSMS is overloaded, together with the stored location information and data utility values, to identify one or more input data streams whose data items are to be discarded, to determine, for each of the moving data stream sources, whether the moving data stream source is following a mobility pattern stored by the learning module, and if the moving data stream source is following the mobility pattern, to determine from the data utility value stored in association with the mobility pattern being followed, whether data items in the corresponding input data stream are to be discarded.

11. The method of claim 10, wherein:

said determining comprises determining, when the DSMS is not overloaded and for the mobility pattern associated with each moving data stream source: a respective first utility value indicating a utility to the client of the DSMS of data generated by the moving data stream source when the moving data stream source is following the mobility pattern in a first direction; and a respective second utility value indicating a utility to the client of the DSMS of data generated by the moving data stream source when the moving data stream source is following the mobility pattern in a second direction substantially opposite to the first direction;

the mobility pattern for each moving data stream source is stored in association with the corresponding first and second data utility values and indicators of the first and second directions that are associated with the first and second data utility values, respectively; and the load shedding process is controlled by:

using location information received when the DSMS is overloaded to determine, for each of the moving data stream sources, whether the moving data stream source is following a stored mobility pattern and, if so, the direction in which the mobility pattern is being followed; and determining from the data utility value stored in association with the mobility pattern and direction being followed whether data items in the corresponding input data stream are to be discarded.

12. The method of claim 10, wherein:

the continuous query is executed by determining, for each of the input data streams, whether at least one data item in the input data stream satisfies a predetermined condition and, where at least one data item in at least one of the input data streams has been determined to satisfy the predetermined condition, outputting at least one output data stream based on the at least one input data stream; and the method further comprises:

generating, each time at least one output data stream is generated by execution of the continuous query, a feedback signal that allows location information associated with at least one data stream source on whose data the at least one output data stream is based to be identified;

monitoring the feedback signal; and determining, for the location information associated with each of the sets of at least one data stream source, a respective utility of the data from the at least one data stream source in the set to the DSMS client, based on how frequently the data in the at least one input data stream from the set of at least one data stream source causes an output data stream to be output.

13. The method of claim 12, wherein: the generated feedback signal comprises an identifier that allows location information associated with at least one data stream source on whose data the at least one output data stream is based to be identified; and the method further comprises determining, for the location information associated with each set of at least one data stream source a respective utility of the data from the at least one data stream source in the set, by monitoring how frequently said location information is identified based on the received identifier.

14. The method of claim 13, wherein:

each received input data stream comprises geographical coordinates identifying a point where the respective data stream source is located;

the at least one output data stream comprises geographical coordinates identifying a point where each of at least one data stream source, on whose data the at least one output data stream is based, is located; and the identifier in the generated feedback signal comprises the geographical coordinates from the output data stream.

15. The method of claim 12, wherein the at least one data stream source, on whose data an output data stream is based, is determined by determining the input data streams that were one of received and processed in a predetermined time interval prior to receipt of the feedback signal.

16. The method of claim 15, further comprising:
storing, for each of the input data streams, an input data stream identifier in association with the location information of the data stream source generating the input data stream;
logging times of arrival or processing of data items received via each input data stream;
identifying, using the logged times, at least one input data stream via which at least one data item was one of received and processed in the predetermined time interval prior to receipt of the feedback signal; and
identifying, using the identified at least one input data stream and the stored location information and associated input data stream identifiers, the location information associated with at least one data stream source on whose data the at least one output data stream is based, wherein a respective utility of the data from the data stream source in the set is determined for the location information associated with each set of at least one data stream source by monitoring how frequently said location information is identified based on the received feedback signal.

17. The method of claim 10, wherein the DSMS operates in:
an operational-and-learning mode to execute the continuous query against data items received via the input data streams, and determine, for the location information associated with each of the sets of at least one data stream source, a respective utility value of data from the set of at least one data stream source when the data rate from the input data streams is below a certain limit that provides substantially no degradation of a Quality-of-Service figure that is required for the continuous query being executed by the DSMS; and
an operational-and-load-shedding mode to perform the load shedding process when the data rate from the input data streams exceeds said limit, the load shedding process being performed in accordance with the data utility values determined during the operational-and-learning mode,
wherein the DSMS continually monitors the data rate from the input data streams and changes from operating in the operational-and-load-shedding mode to operating in the operational-and-learning mode when said data rate decreases to below said limit.

18. The method of claim 10, further comprising:
the DSMS client receiving and processing the at least one output data stream generated by the DSMS, and executing an action when triggered by the processing of at least one data item in the at least one output data stream, the action comprising the sending by the DSMS client of a signal to a recipient different from the DSMS client;
a feedback signal being conveyed to the DSMS that notifies the DSMS of the execution of an action by the DSMS client; and determining, when the DSMS is not overloaded and for the location information associated with each of the sets of at least one data stream source, a respective utility value indicating a utility to the DSMS client of data from the at least one data stream source in the set by processing the feedback signal, wherein the location information is stored in association with the corresponding data utility value.

19. A non-transitory computer-readable storage medium storing computer program instructions which, when executed by a processor, cause the processor to perform a method of processing stream data in a data stream management system, DSMS, the method comprising the DSMS:
receiving an input data stream from each of at least one of a plurality of data stream sources and a plurality of moving data stream sources and respective location information associated with sets of at least one or more of the data stream sources and location information of the plurality of the moving data stream sources at different times respectively, such that the location information for each of the plurality of moving data stream sources defines a mobility pattern of the data stream source;
executing a continuous query against data items received via the input data streams to generate at least one output data stream for output to a client of the DSMS;
determining, when the DSMS is not overloaded with data from the input data streams and for the location information associated with each of the sets of at least one data stream source and each moving data stream source, a respective utility value indicating a utility to the client of the DSMS of data from the set of at least one data stream source and the moving data stream sources, by processing a feedback signal that is based on the at least one output data stream;
storing, in association with the location information associated with each of the sets of at least one data stream source, the corresponding data utility value and the mobility pattern in association with the corresponding data utility value; and
executing a load shedding process when the DSMS is overloaded with data from the input data streams, so as to discard a plurality of the data items comprising at least one of as one of received by the DSMS and that have been partially processed by the DSMS, the load shedding process being controlled by using location information received when the DSMS is overloaded, together with the stored location information and data utility values,
to identify one or more input data streams whose data items are to be discarded,
to determine, for each of the moving data stream sources, whether the moving data stream source is following a mobility pattern stored by the learning module, and
if the moving data stream source is following the mobility pattern, to determine from the data utility value stored in association with the mobility pattern being followed whether data items in the corresponding one or more input data streams are to be discarded.

* * * * *